(12) United States Patent
Krauthamer et al.

(10) Patent No.: US 12,233,531 B2
(45) Date of Patent: Feb. 25, 2025

(54) SYSTEMS AND METHODS TO CONTROL AN ENTERTAINMENT FIGURE

(71) Applicant: Universal City Studios LLC, Universal City, CA (US)

(72) Inventors: Akiva Meir Krauthamer, Orlando, FL (US); Aaron Chandler Jeromin, Winter Garden, FL (US); Elam Kevin Hertzler, Winter Garden, FL (US)

(73) Assignee: Universal City Studios LLC, Universal City, CA (US)

(*) Notice: Subject to any disclaimer, the term of this patent is extended or adjusted under 35 U.S.C. 154(b) by 1309 days.

(21) Appl. No.: 16/829,608

(22) Filed: Mar. 25, 2020

(65) Prior Publication Data

US 2021/0299881 A1 Sep. 30, 2021

(51) Int. Cl.
*B25J 11/00* (2006.01)
*A63J 19/00* (2006.01)
*B25J 9/16* (2006.01)

(52) U.S. Cl.
CPC ......... *B25J 11/0015* (2013.01); *A63J 19/006* (2013.01); *B25J 9/163* (2013.01)

(58) Field of Classification Search
CPC ...... B25J 11/0015; B25J 9/163; B25J 9/1045; B25J 9/106; B25J 9/1623; B25J 9/1671; B25J 11/003; A63J 19/006; G06T 2219/2021; G06T 13/40; G06T 19/20; A63G 31/00

See application file for complete search history.

(56) References Cited

U.S. PATENT DOCUMENTS

| 4,683,669 | A | 8/1987 | Greer, Jr. |
| 5,021,878 | A | 6/1991 | Lang |
| 5,289,273 | A | 2/1994 | Lang |
| 7,859,538 | B2 | 12/2010 | Isner et al. |
| 9,418,465 | B2 | 8/2016 | Rubin et al. |
| 2007/0038331 | A1 | 2/2007 | Hanson |
| 2013/0139631 | A1 | 6/2013 | Lin et al. |
| 2016/0096318 | A1 | 4/2016 | Bickel et al. |

FOREIGN PATENT DOCUMENTS

| CN | 101474481 A | 7/2009 |
| CN | 110103234 A | 8/2019 |
| JP | H0896162 A | 4/1996 |

(Continued)

OTHER PUBLICATIONS

PCT/US2021/023424 Invitation to Pay Additional Fees mailed Jul. 15, 2021.

(Continued)

*Primary Examiner* — Basil T. Jos
(74) *Attorney, Agent, or Firm* — Fletcher Yoder, P.C.

(57) ABSTRACT

An animated figure system includes an animated figure comprising a flexible skin layer, an actuating system coupled to a connection location of the flexible skin layer, and an automation controller. The automation controller is configured to access a digital model of the animated figure, in which the digital model comprises a vertex associated with the connection location, determine a first positioning of the vertex within the digital model, and control the actuating system to set a second positioning of the connection location based on the first positioning of the vertex.

15 Claims, 7 Drawing Sheets

(56) References Cited

FOREIGN PATENT DOCUMENTS

KR          101002619 B1      12/2010

OTHER PUBLICATIONS

Daniele Mazzei et al., "HEFES: An Hybrid Engine for Facial Expressions Synthesis to control human-like androids and avatars", Biomedical Robotics and Biomechatronics (BIOROB), Jun. 24, 2012 (Jun. 24, 2012, pp. 195-200, 4th IEEE Ras&Embs International Conference On, IEEE.
AE Office Action for United Arab Emirates Application No. P6001820/22 mailed Nov. 21, 2024.
EP Office Action for European Application No. 24194315.8 mailed Nov. 12, 2024.

SYSTEMS AND METHODS TO CONTROL AN ENTERTAINMENT FIGURE

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Amusement parks may include various features to provide a unique experience to guests. For example, an amusement park may have various rides and shows that entertain guests. Furthermore, the amusement park may have show effects and props that may create a desirable environment or atmosphere for guests. Such features may include entertainment figures (e.g., animated characters, animated figures) that may interact with guests. For instance, the entertainment figures may speak, wave, walk, or perform any other suitable actions.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an animated figure system includes an animated figure comprising a flexible skin layer, an actuating system coupled to a connection location of the flexible skin layer, and an automation controller. The automation controller is configured to access a digital model of the animated figure, in which the digital model comprises a vertex associated with the connection location, determine a first positioning of the vertex within the digital model, and control the actuating system to set a second positioning of the connection location based on the first positioning of the vertex.

In an embodiment, an animated figure system includes an animated figure having a connection location, a first actuator, and an extension having an end coupled to the connection location and a section coupled to the first actuator such that a length of the extension extends between the connection location and the first actuator. The first actuator is configured to move the section of the extension. The animated figure system also includes a second actuator configured to extend or retract the extension to change the length of the extension extending between the connection location and the first actuator and an automation controller configured to control the first actuator and the second actuator to set a positioning of the connection location.

In an embodiment, a non-transitory computer-readable medium having executable instructions that, when executed by a processor, are configured to cause the processor to access a digital model of an animated figure, in which the animated figure includes a connection location, and the digital model comprises a vertex associated with the connection location. The instructions are also configured to cause the processor to determine a first positioning of the vertex of the digital model and control an actuating system of the animated figure to set a second positioning of the connection location based on the first positioning of the vertex of the digital model.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
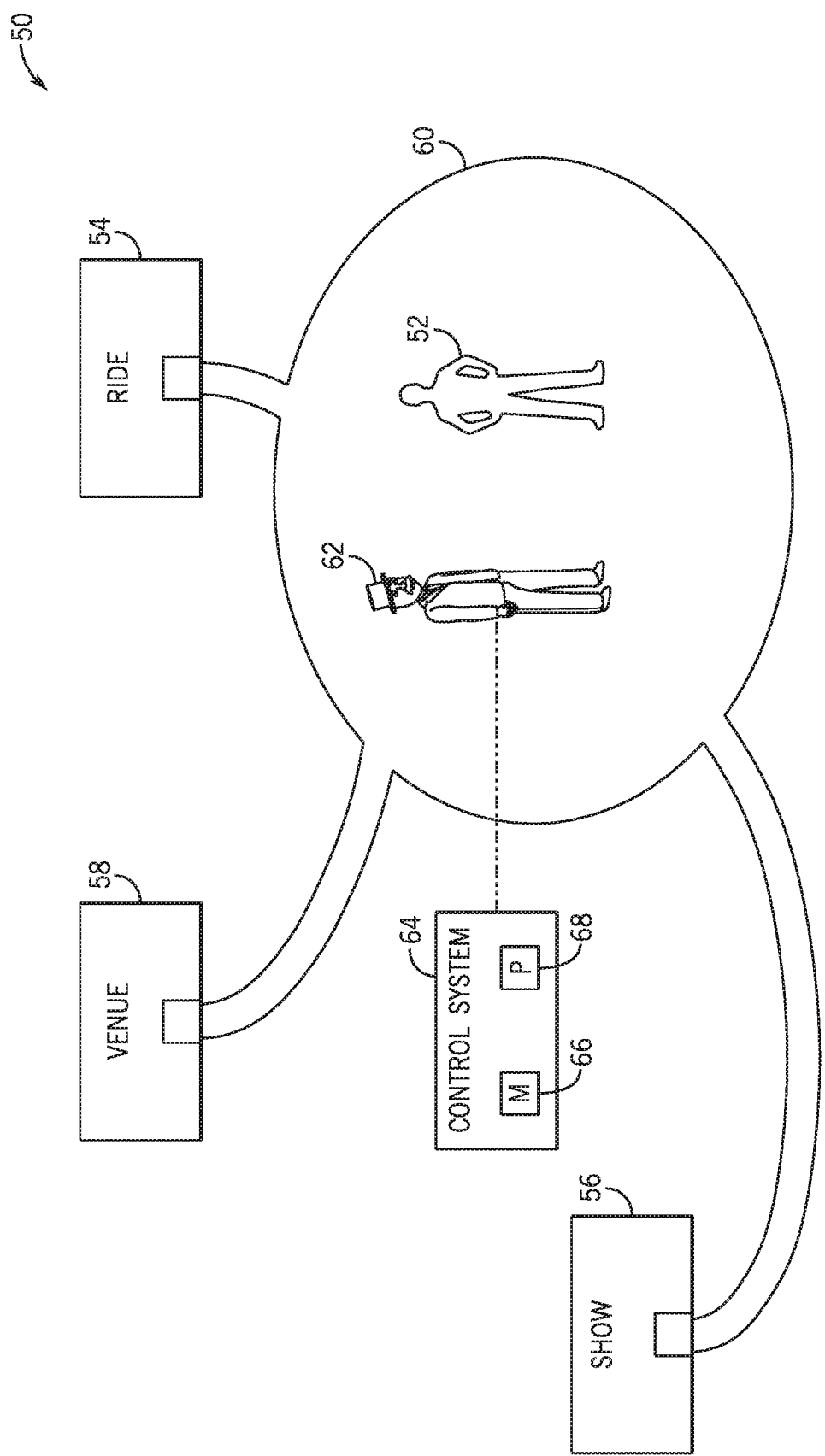
FIG. 1 is a schematic view of an embodiment of an amusement park having an entertainment figure, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to an amusement park. The amusement park may include various features to entertain guests and patrons. For instance, the amusement park may include attractions, such as rides or shows. The amusement park may also include props and show effects to provide unique experiences for the guests. Such props and show effects may include an entertainment figure (e.g., an animated character, an animated figure). As used herein, an entertainment figure refers to any suitable physical prop that uses a mechanical feature to move or change a surface that is visible to a guest. In an example, the entertainment figure may include an automated or remotely-controlled machine (e.g., a robot). In another example, the entertainment figure may include a suit wearable by a person and equipped with a mechanical feature. In any case, the mechanical feature of the entertainment figure may perform a unique function, such as an automated action. The entertainment figure may interact with the guests to provide an interactive entertainment experience for the guests, and the mechanical feature may enhance the experience for the guests. Although the present disclosure is primarily directed to an amusement park, it should be noted that techniques and features described herein may be implemented in any suitable setting or venue.

Without the disclosed embodiments, it may be difficult to control certain aspects of the entertainment figures and/or to emulate a realistic representation, thereby limiting the experience provided by the entertainment figure. It is now recognized that it would be desirable to control facial expressions of the entertainment figure to portray a more realistic representation (e.g., emotion). Accordingly, embodiments of the present disclosure are directed to an improved system to control the entertainment figure and to improve the experience provided by the entertainment figure.

In an embodiment, a virtual (e.g., digital, computerized) model of the entertainment figure is referenced, and the virtual model represents a realistic depiction of at least a portion (e.g., face) of the entertainment figure. Different virtual parts of the virtual model may be associated with corresponding physical parts of the entertainment figure. The position, orientation, movement, and so forth, of the virtual parts may be monitored to determine a corresponding position, orientation, and/or movement of the physical parts. The entertainment figure may include an actuating system configured to coordinate movement of the physical parts to match that of the virtual parts. Indeed, the actuating system may be controlled based on the virtual model to move the entertainment figure accordingly. In this way, the entertainment figure may closely emulate the realistic virtual model, thereby enabling the entertainment figure to appear and/or move more realistically.

Turning now to the drawings, FIG. 1 is a schematic view of an embodiment of an amusement park 50 that includes features to entertain a guest 52. The amusement park 50 may include a ride 54, which may be a roller coaster, a water ride, a drop tower, a motion simulator, and the like. The amusement park 50 may additionally or alternatively include a show 56, such as a theatrical show, a performance, a concert, and so forth. Moreover, the amusement park 50 may include a venue 58, which may be a food venue (e.g., restaurant), a merchandise store, a hotel, or any other suitable venue 58. The guest 52 may move through the amusement park 50, such as via a pathway 60, to navigate anywhere within the amusement park 50, including to the ride 54, the show 56, and/or the venue 58. Furthermore, the amusement park 50 may include an entertainment FIG. 62 (e.g., an animated character, an animated figure), which may interact with the guest 52. It should be noted that the entertainment FIG. 62 may also be at any suitable location within or outside of the amusement park 50.

In one embodiment, the entertainment FIG. 62 may be entirely electromechanical, such as a robot that is programmed to move automatically or via remote control (e.g., not worn by or manually moved via contact with a user or operator). In an additional or alternative embodiment, the entertainment FIG. 62 may be partially electromechanical and certain functions of the entertainment FIG. 62 may be enabled manually via contact with a user or operator. For instance, the entertainment FIG. 62 may include a suit that is wearable by a person and has electromechanical components (e.g., a headgear with mechanically driven facial features), in which the electromechanical components may perform certain functions (e.g., movement of the facial features), but the person may manually orient or position the mechanical components (e.g., by moving their head). In this way, the entertainment FIG. 62 may include various features and/or may perform at least certain functions without manual assistance, such as to represent a character that may not be enabled by mere movement of a person.

In an embodiment, the entertainment FIG. 62 may include or be communicatively coupled with a control system 64 (e.g., an electronic controller; an automation controller, such as a programmable-logic controller [PLC]), which may operate the entertainment FIG. 62, such as by causing at least certain portions of the entertainment FIG. 62 to move. The control system 64 may include a memory 66 and a processor 68, such as a microprocessor. The memory 66 may include volatile memory, such as random access memory (RAM), and/or non-volatile memory, such as read-only memory (ROM), optical drives, hard disc drives, solid-state drives, or any other non-transitory computer-readable medium that includes instructions to operate the entertainment FIG. 62. The processor 68 may include one or more application specific integrated circuits (ASICs), one or more field programmable gate arrays (FPGAs), one or more general purpose processors, or any combination thereof, configured to execute the instructions stored in the memory 66 to cause the entertainment FIG. 62 to operate accordingly. By way of example, the control system 64 may cause a part of the entertainment FIG. 62 to move relative to another part of the entertainment FIG. 62.

The entertainment FIG. 62 may interact with the guest 52 to provide a unique experience to the guest 52. As an example, the entertainment FIG. 62 may provide a realistic representation of a character, such as by speaking with the guest 52. For instance, while the guest 52 is navigating through the amusement park 50, the entertainment FIG. 62 may provide entertainment to the guest 52 outside of the ride 54, the show 56, or the venue 58. Additionally or alternatively, the entertainment FIG. 62 may interact with the guest 52 within the ride 54, the show 56, and/or the venue 58 to provide further entertainment to the guest 52. Indeed, the entertainment FIG. 62 may be positioned at any suitable location and/or may move throughout the amusement park 50 to entertain guests 52 anywhere within the amusement park 50.

Figure 2:
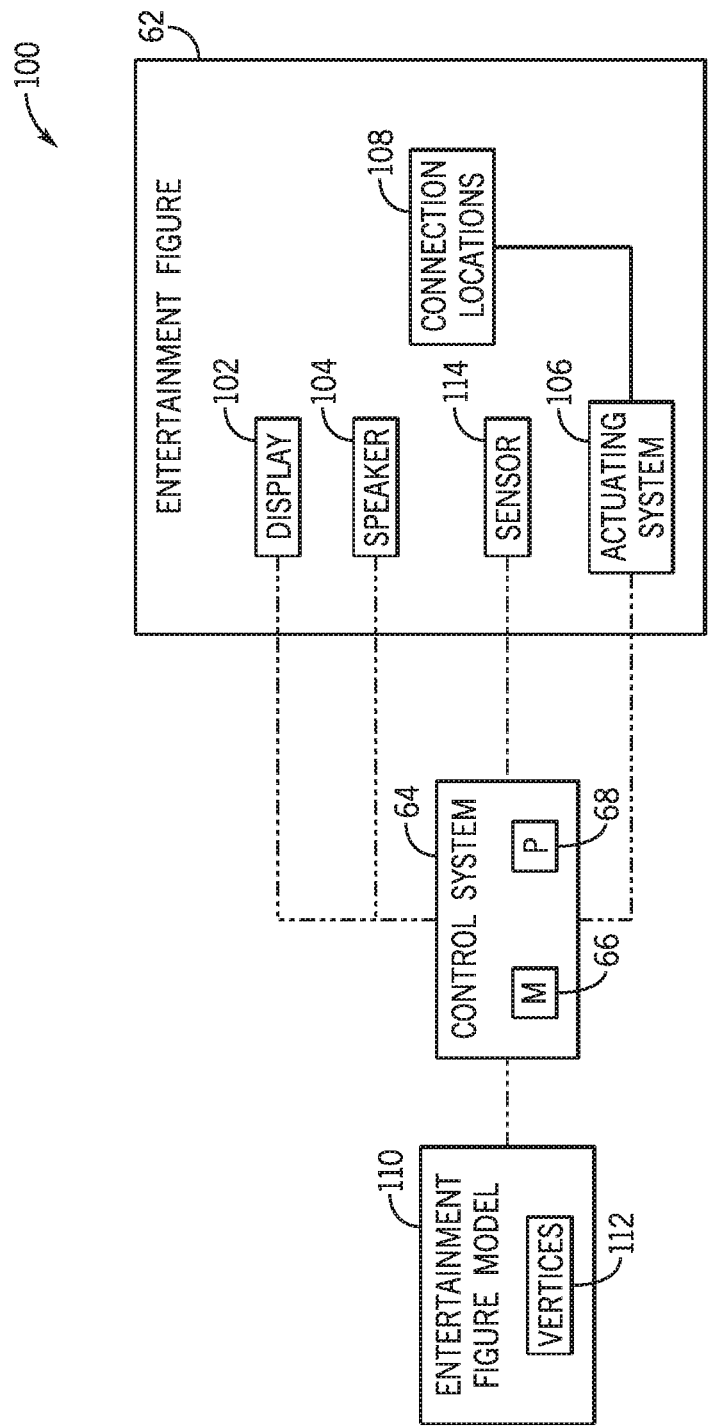
FIG. 2 is a schematic view of an embodiment of an entertainment figure system that may be used to operate an entertainment figure, in accordance with an aspect of the present disclosure.

FIG. 2 is a schematic view of an embodiment of an entertainment figure system 100, which may be used to operate the entertainment FIG. 62. The entertainment figure system 100 includes the control system 64, which may be communicatively coupled to a display 102 of the entertainment FIG. 62. As an example, the control system 64 may cause the display 102 to present a visual output, such as a light, a projection (e.g., an animation of a feature), or any other suitable visual output that is visible to guests of the amusement park. The control system 64 may be communicatively coupled to a speaker 104 of the entertainment FIG. 62 to cause the speaker 104 to present an audio output, such as a sound effect, that is audible by the guests. The control system 64 may be communicatively coupled to an actuating system 106 of the entertainment FIG. 62 so as to cause movement of various parts of the entertainment FIG. 62. For instance, the actuating system 106 may include actuators (e.g., pneumatic, electromechanical, hydraulic, soft-robotic), such as linear actuators, rotational actuators, and so forth, that are attached to various connection locations 108 (e.g., points, sections, surface areas, volumes) of the entertainment FIG. 62. In this way, the actuating system 106 may move (e.g., push, pull) the connection locations 108 relative to one another in order to move the entertainment FIG. 62.

In an embodiment, the connection locations 108 may be associated with different sections of the entertainment FIG. 62. For example, one of the connection locations 108 may be located at an arm of the entertainment FIG. 62 and another of the connection locations 108 may be located at a torso of the entertainment FIG. 62. As such, the actuating system 106 may move the arm relative to the torso. In an additional or alternative embodiment, the connection locations 108 may be associated with different parts of the same section of the entertainment FIG. 62. As an example, one of the connection locations 108 may be located at a part of the forehead of the entertainment FIG. 62, and another connection location 108 may be located at another part of the forehead. The actuating system 106 may then move the different parts of the forehead relative to one another to cause fine movement, such as wrinkling, of the forehead, thereby creating a more realistic appearance of the entertainment FIG. 62. Indeed, the connection locations 108 may be positioned at any suitable part of the entertainment FIG. 62 to cause the entertainment FIG. 62 to move in a realistic manner.

In the illustrated embodiment, the entertainment figure system 100 further includes an entertainment figure model 110 that is accessible to the control system 64. For instance, the entertainment figure model 110 may be stored in the memory 66 of the control system 64 and/or in a database, such as a cloud-based storage, that is separate from the control system 64 and may be readily referenced by the control system 64. As used herein, the entertainment figure model 110 includes any virtual model representative of the entertainment FIG. 62. By way of example, the entertainment figure model 110 may include a digital (e.g., computerized, virtual) three-dimensional model of the entertainment FIG. 62. The entertainment figure model 110 may provide a realistic virtual display, such as a realistic orientation, appearance, movement, and so forth, of the entertainment FIG. 62. The entertainment figure model 110 may animate to move multiple facial features to represent a particular emotional expression (e.g., a smile). The control system 64 may determine the animation of the entertainment figure model 110 (e.g., via motion capture, frame tracking), and the control system 64 may cause the entertainment FIG. 62 to move accordingly to match the movement of the entertainment figure model 110, thereby emulating realistic movement.

To this end, the entertainment figure model 110 may include multiple vertices or other suitable sections 112. By way of example, the entertainment figure model 110 includes a mesh structure having the vertices 112. The vertices 112 may move as the entertainment figure model 110 moves to orient with one another in a specific manner. Furthermore, at least a portion of the connection locations 108 may correspond to the respective vertices 112. The control system 64 may operate the entertainment FIG. 62 such that the orientation of the connection locations 108 aligns with or matches the orientation of the vertices 112 so as to produce a realistic appearance of the entertainment FIG. 62. In one embodiment, the entertainment figure model 110 may include a single digital image having the vertices 112 at respective positionings, and the control system 64 may set the positionings of the connection locations 108 to match with the respective positionings of the vertices 112 in the digital image, thereby producing a realistic pose of the entertainment FIG. 62.

In an additional or alternative embodiment, the entertainment figure model 110 may include multiple digital images, and each digital image may have the vertices 112 at various respective positionings, such as different positionings over an interval of time to represent movement of a virtual entertainment figure. The control system 64 may move the connection locations 108 based on (e.g., to match with) the positionings of the digital images over the time interval, thereby producing a realistic movement of the entertainment FIG. 62 over the time interval. In other words, as the entertainment figure model 110 moves to cause movement of the vertices 112 (e.g., to various positions over time), the control system 64 may control the actuating system 106 to cause corresponding movement of the connection locations 108 (e.g., to various positions over time). By way of example, the vertices 112 may be different parts of the face of the entertainment figure model 110 and may move in a realistic manner in the entertainment figure model 110 to form a smile, and the control system 64 may cause the connection locations 108 to move in a corresponding manner that matches with the movement of the vertices 112, thereby causing the entertainment FIG. 62 to also move in a realistic manner to form a smile. As such, the control system 64 may move the connection locations 108 to control fine motor movements of different parts of the entertainment FIG. 62, such as to form realistic skeletal structures, skin wrinkles, and the like, thereby providing a more realistic entertainment FIG. 62.

In an embodiment, the entertainment FIG. 62 may include a sensor 114 (e.g., one or more sensors) that is configured to determine a parameter of the entertainment FIG. 62 and is communicatively coupled to the control system 64. As an example, the sensor 114 may determine the position of the connection locations 108, and the sensor 114 may transmit data to the control system 64 to indicate the position of the connection locations 108. The control system 64 may utilize the data to operate the entertainment FIG. 62. For example, the control system 64 may determine whether the position of the connection locations 108 substantially match with the position of the vertices 112 to determine whether the connection locations 108 are to be adjusted. In this way, the data may provide feedback and enable the control system 64 to position the connection locations 108 more accurately and cause the entertainment FIG. 62 to provide a more realistic appearance. Additionally or alternatively, the sensor 114 may be configured to determine a different parameter associated with the entertainment figure system 100, such as an audio input (e.g., words spoken by a guest to the entertainment FIG. 62), a proximity of objects adjacent to the entertainment FIG. 62, a time of day, another suitable parameter, or any combination thereof. The control system 64 may receive data indicative of the operating parameter monitored by the sensor 114 and control the entertainment FIG. 62 accordingly.

Figure 3:
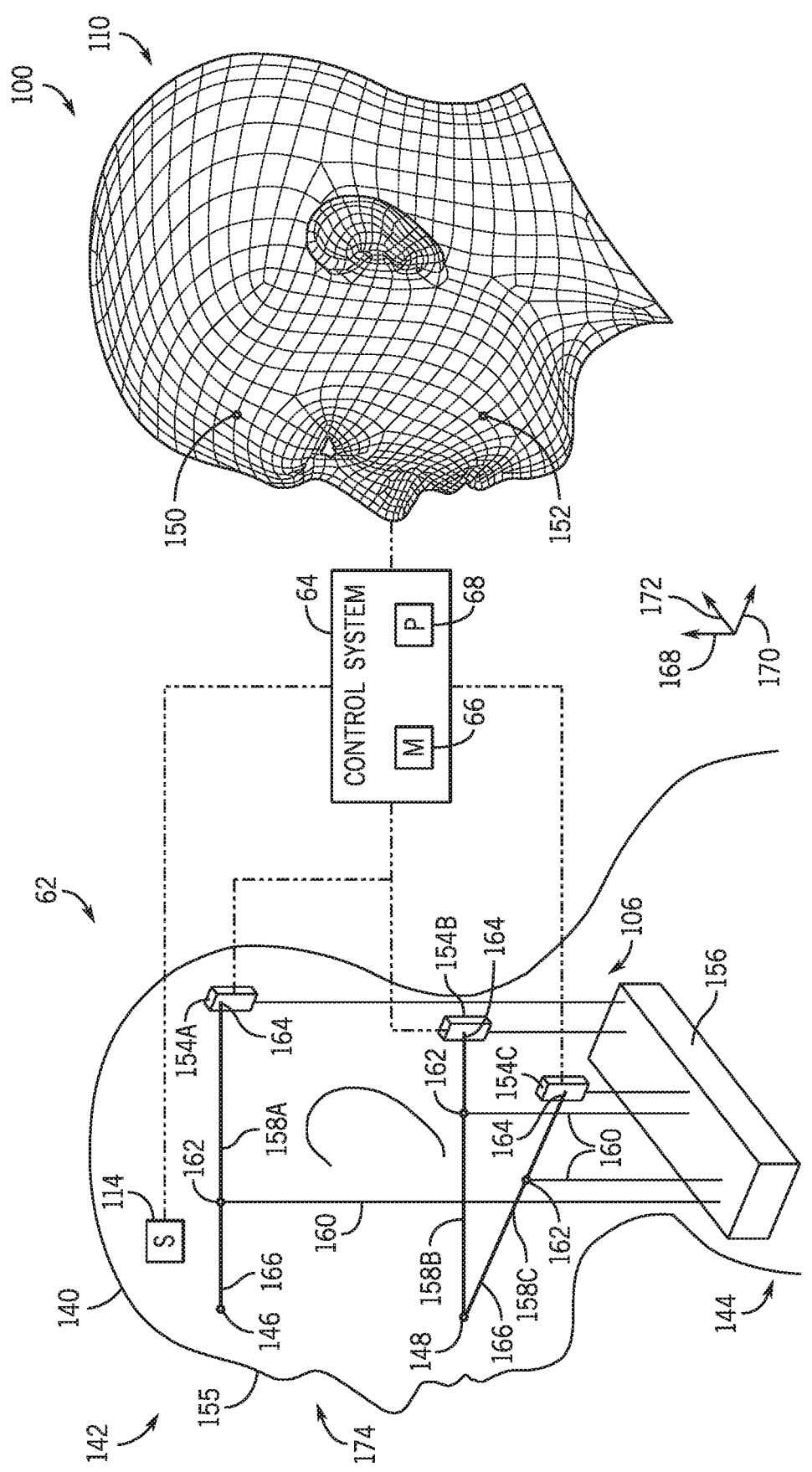
FIG. 3 is a side cross-sectional view of an embodiment of an entertainment figure system that may be used to operate an entertainment figure, in accordance with an aspect of the present disclosure.

FIG. 3 is a side cross-sectional view of an embodiment of the entertainment FIG. 62, which includes a head 140 having a face 142. Furthermore, the entertainment FIG. 62 includes the actuating system 106 that is communicatively coupled to the control system 64. The illustrated actuating system 106 is positioned within the head 140 and a neck area 144 of the entertainment FIG. 62. However, in an additional or alternative embodiment, the actuating system 106 may be positioned in any suitable manner relative to the entertainment FIG. 62, such as within legs of the entertainment FIG. 62, at least partially external to the entertainment FIG. 62, or any combination thereof. The illustrated actuating system 106 may be configured to move certain parts of the face 142, such as a first connection location 146 and/or a second connection location 148, each of which may be a part of a layer 155 (e.g., skin, silicone layer) of the face 142 of the entertainment FIG. 62. Although the illustrated embodiment primarily discusses moving the layer 155 of the face 142, it should be noted that the disclosed techniques may be implemented to move a layer of any suitable part of the entertainment FIG. 62, including a torso, a leg, a hand, or any other suitable portion visible to a guest.

The entertainment figure system 100 further includes the entertainment figure model 110 that may be referenced by the control system 64. The entertainment figure model 110 is shown as a polygon mesh in the illustrated embodiment, but the entertainment figure model 110 may additionally or alternatively include any suitable model that may be used by the control system 64 to control the entertainment FIG. 62. The entertainment figure model 110 may include a first vertex 150, which may correspond to the first connection location 146, and a second vertex 152, which may correspond to the second connection location 148. That is, the control system 64 may cause the actuating system 106 to move the first connection location 146 based on (e.g., to match) movement of the first vertex 150 and, simultaneously or sequentially, to move the second connection location 148 based on (e.g., to match) movement of the second vertex 152. For example, the vertices 150, 152 of the entertainment figure model 110 may be positioned and oriented in certain manners to provide a realistic depiction of the entertainment figure model 110. The control system 64 may control the connection locations 146, 148 to match the position and orientation of the vertices 150, 152, thereby matching the appearance of the entertainment FIG. 62 with the entertainment figure model 110, thereby presenting the entertainment FIG. 62 more realistically.

The illustrated actuating system 106 includes multiple actuators 154 that are each configured to control one of the connection locations 146, 148. For example, a first actuator 154A may control the first connection location 146, a second actuator 154B may control the second connection location 148, and a third actuator 154C may also control the second connection location 148. Furthermore, in the illustrated embodiment, each actuator 154 is coupled to a base 156 (e.g., frame) that supports the actuators 154 and blocks unwanted movement of the actuators 154 (e.g., caused by a gravitational force). In an additional or an alternative embodiment, each actuator 154 may be coupled to a separate support, and/or each actuator 154 may be supported in any suitable manner to block unwanted movement of the actuators 154. In addition, an extension 158 may be coupled to each actuator 154 and to the corresponding connection locations 146, 148. That is, a first extension 158A is coupled to the first actuator 154A and to the first connection location 146 (e.g., via an end effector of the first extension 158A), a second extension 158B is coupled to the second actuator 154B and to the second connection location 148 (e.g., via an end effector of the second extension 158B), and a third extension 158C is coupled to the third actuator 154C and to the second connection location 148 (e.g., via an end effector of the third extension 158C).

The control system 64 may control the actuators 154 to move the corresponding extensions 158 and thereby move the associated connection locations 146, 148. Although the actuators 154 and/or portions of the extensions 158 are positioned internally within the illustrated entertainment FIG. 62, the actuators 154 and extensions 158 may be positioned external to the entertainment FIG. 62 in an additional or alternative embodiment. For example, the actuators 154 may be attached to a wall or support structure that is located exterior to the entertainment FIG. 62. Additionally, the actuating system 106 may be easily accessible, such as for performing maintenance. By way of example, the head 140 may be easily detached from the connection locations 146, 148 and may be removed from a remainder of the entertainment FIG. 62 such that the interior of the entertainment FIG. 62 is exposed to enable access to the actuating system 106.

Furthermore, in an embodiment, each extension 158 may be coupled to the base 156 by a respective support 160 attached to the extension 158 along the length of the extension 158. Each support 160 may block the corresponding extension 158 from substantially deforming (e.g., bending, changing in length). In this manner, each of the extensions 158 and supports 160 includes a rigid structure (e.g., a rod or tube). A respective support feature, such as a joint 162, that enables movement of the extensions 158 relative to the supports 160 may be provided at an interface between each extension 158 and its support 160. By way of example, each joint 162 may be a ball and socket joint that enables the extensions 158 to rotate about the respective supports 160, but the position of each joint 162 may be substantially maintained such that the sections of each extension 158 coupled to the respective joints 162 may be substantially maintained relative to one another. As an example, an end of the support 160 is a socket, and a curved portion of the extension 158 rotates within the socket. However, the joint 162 may be any suitable type of joint (e.g., a hinge) that may be used to support the extension 158, to provide a mechanical advantage for moving the extension 158, to reduce movement of a particular section of the extension 158 (e.g., relative to one another), or any combination thereof.

In one embodiment, each actuator 154 may remain substantially fixed relative to the base 156, but each extension 158 may move relative to the actuators 154. By way of example, the actuators 154 may move a respective first end 164 of each extension 158, thereby causing corresponding movement (e.g., rotational movement about the joints 162) of a respective second end 166 of each extension 158 to move the connection locations 146, 148. In an embodiment, the actuators 154 (e.g., gantry-like actuator) may move the respective first ends 164 in multiple degrees of freedom, such as along a plane formed by a vertical axis 168 and a lateral axis 170 and/or along a plane formed by the lateral axis and a longitudinal axis 172. In one embodiment, the supports 160 may be flexible to move (e.g., flex, bend) relative to the base 156 to enable the actuators 154 to move the extensions 158 along a plane formed by the vertical axis 168 and the longitudinal axis 172. For example, the actuators 154 may move the first ends 164 toward a front 174 of the face 142, and the supports 160 may bend toward the front 174 of the face 142 to cause the second ends 166 of the extensions 158 and therefore the connection locations 146, 148 to move toward the front 174 of the face 142. In an additional or an alternative embodiment, the actuators 154 may move relative to the base 156 to move the connection locations 146, 148. That is, for example, the actuators 154 may be movably (e.g., hingedly, rotatably) coupled to the base 156. Therefore, the control system 64 may control the movement of the actuators 154 relative to the base 156 in order to move the connection locations 146, 148. In any case, the control system 64 may control the actuators 154 in any suitable manner to cause the extensions 158 to move the connection locations 146, 148.

As mentioned herein, the second actuator 154B and the third actuator 154C may both be configured to control the second connection location 148. In this way, the control system 64 may operate both the second actuator 154B and the third actuator 154C to move the second connection location 148, and movement of the second connection location 148 may therefore be more acutely controlled. For example, the second extension 158B and the third extension 158C may be moved in different manners in order to cause certain movement, such as twisting and/or rotation, of the face 142 at the second connection location 148 more acutely. For this reason, multiple actuators may be coupled to a connection location to enable greater control of the connection location. Moreover, although each actuator 154 is coupled to a single extension 158 in the illustrated embodiment, in an additional or alternative embodiment, any of the actuators 154 may be coupled to multiple extensions 158. Such extensions 158 may be coupled to the same connection location or to separate connection locations. In this manner, a single actuator 154 may be configured to control multiple different connection locations.

Further, although the illustrated entertainment figure system 100 is configured to control two connection locations 146, 148, an additional or alternative entertainment figure system 100 may control any suitable number (e.g., 10, 20, 30 or more) of connection locations 146, 148. For example, the entertainment FIG. 62 may have a similar number of connection locations 146, 148 as the number of vertices 150, 152 included in the entertainment figure model 110. As such, each section of the entertainment FIG. 62 may be acutely controlled to match with the entertainment figure model 110. In an additional or alternative embodiment, certain sections of the entertainment FIG. 62 may include more connection locations 146, 148 than other sections of the entertainment FIG. 62. For example, it may be more desirable to control the forehead of the entertainment FIG. 62 than the chin of the entertainment FIG. 62. As such, there may be more connection locations 146, 148 located in the forehead area than in the chin area. Moreover, certain areas of the layer 155 may have different attributes to change how movement of the connection locations 146, 148 affects the appearance of the entertainment FIG. 62. By way of example, certain sections of the layer 155 may be more flexible or softer than other sections, and may therefore be easier to move, and movement of the connection locations 146, 148 in such sections may cause wrinkling effects. Other sections of the layer 155 may be stiffer or harder and therefore more difficult to move, and movement of the connection locations 146, 148 in such sections may cause the appearance of skeletal movement. For example, the first connection location 146 may be a part of a first section of the layer 155 having a first (e.g., low) stiffness, and the control system 64 may operate the first actuator 154A to provide a first effect, such as skin wrinkling of the forehead. The second connection location 148 may be a part of a second section of the layer 155 having a second (e.g., high) stiffness, and the control system 64 may operate the second actuator 154B and/or the third actuator 154C to provide a second effect, such as skeletal movement of the chin. Further, while this disclosure primarily discusses movement of the connection locations 146, 148 to cause movement of the layer 155 of the face 142, the connection locations 146, 148 may additionally or alternatively move any other suitable part of the entertainment FIG. 62, such as a more interior section (e.g., tongue) of the face 142, an outer layer of a different part (e.g., a hand) of the entertainment FIG. 62, and the like, to provide a realistic portrayal of the entertainment FIG. 62.

As shown, the entertainment figure system 100 includes the sensor 114, which may transmit data to the control system 64. Such data may include data associated with the connection locations 146, 148, such as respective positionings of the connection locations 146, 148. As used herein, the positioning includes a position, which may include a location along the vertical axis 168, the lateral axis 170, and/or the longitudinal axis 172. The positioning may additionally or alternatively include an orientation, which may include a rotation about the vertical axis 168, the lateral axis 170, and/or the longitudinal axis 172. In any case, the control system 64 may use the data to control the actuators 154 in order to move the connection locations 146, 148 to desirable positionings. For instance, the control system 64 may determine whether the connection locations 146, 148 are at respective positionings corresponding to the positionings of the vertices 150, 152 of the entertainment figure model 110. As a result, the sensor 114 may enable the control system 64 to set the positioning of the connection locations 146, 148 more accurately. In an embodiment, the control system 64 may store the data received by the sensor 114 in order to monitor the change in respective positionings of the connection locations 146, 148, such as to track motion data of the entertainment FIG. 62. The data may be retrieved at a later time, such as to analyze historical positionings of the connection locations 146, 148 during previous operations of the entertainment FIG. 62.

In an embodiment, the layout of the actuating system 106 may be generated by a computer model, such as based on the entertainment figure model 110 (e.g., a pose and/or a movement of the entertainment figure model 110). The generated layout may enable usage of the actuating system while avoiding collisions between various parts of the actuating system. The layout generated by the computer model may additionally or alternatively include a report having instructions for assembly of the components of the actuating system. In one embodiment, the layout may also include data that enables automatic manufacture of at least part of the actuating system, such as three-dimensional printing of the extensions 158. As such, the computer model may facilitate the manufacture and/or operation of the actuating system 106.

Figure 4:
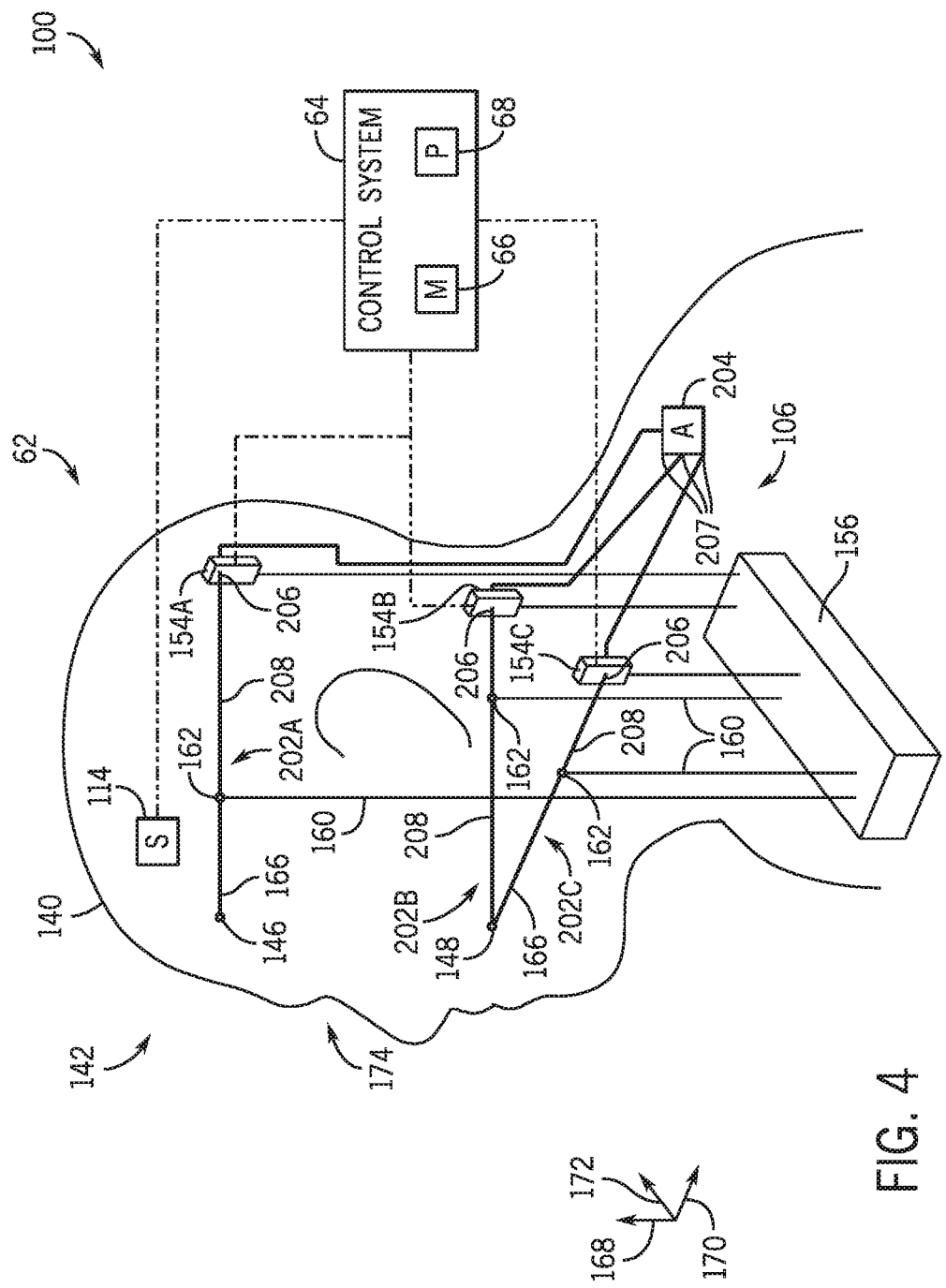
FIG. 4 is a side cross-sectional view of an embodiment of an entertainment figure system that may be used to operate an entertainment figure, in accordance with an aspect of the present disclosure.

FIG. 4 is a side cross-sectional view of an embodiment of the entertainment FIG. 62. The actuating system 146 includes the actuators 154 and also extensions 202 that are coupled to the actuators 154 and one of the connection locations 146, 148. Each extension 202 may be further coupled to the respective supports 160 via engagement of the joints 162. Moreover, the extensions 202 may include a more flexible material relative to the extensions 158 (FIG. 3). For example, the extensions 202 may include a cable, a wire, and the like. In this way, a respective length of the extensions 202 spanning between the actuators 154 and the connection locations 146, 148 may be adjustable. For instance, the length of one of the extensions 202 may be increased to move the corresponding connection location 146, 148 away from the actuator 154 (e.g., in a direction transverse to the plane formed by the vertical axis 168 and the lateral axis 170). The length of one of the extensions 202 may also be reduced to move the corresponding connection location 146, 148 toward the actuator 154. To this end, each extension 202 may pass through the corresponding joint 162, and the joint 162 may engage a different part of the extension 202 as the length of the extension 202 is changed.

In an embodiment, the respective actuators 154 may be configured to change the respective lengths of the extensions 202 spanning between the connection locations 146, 148 and the actuators 154. For instance, each actuator 154 may include a feature (e.g., a winch) that may cause the extension 202 to move transversely relative to the plane formed by the vertical axis 168 and the lateral axis 170. In an additional or alternative embodiment, the actuating system 106 may include an auxiliary actuator 204 configured to adjust the length of the extensions 202. For instance, the extensions 202 may pass through the respective actuators 154 such that a first section 206 of each extension 202 is coupled to the actuator 154 and a second section 207 is coupled to the auxiliary actuator 204. As the auxiliary actuator 204 changes the length of the extension 202, the extension 202 moves through the actuator 154 and through the joint 162 to change the first section 206 of the extension 202 coupled to the actuator 154. By way of example, the auxiliary actuator 204 may include a winch of the extension 202, and the auxiliary actuator 204 may adjust the winch to extend or retract the extension 202 in order to change the length of the extension 202 spanning between the connection location 146, 148 and the actuator 154. The control system 64 may control the actuators 154 to move the connection locations 146, 148 substantially along the plane formed by the lateral axis 170 and the longitudinal axis 172 and/or substantially along the plane formed by the vertical axis 168 and the lateral axis 170, and the control system 64 may control the auxiliary actuator 204 to move the connection locations 146, 148 substantially along the plane formed by the vertical axis 168 and the longitudinal axis 172.

In the illustrated embodiment, a single auxiliary actuator 204 is configured to control the length of each of the extensions 202. However, in an additional or alternative embodiment, the actuating system 106 may include multiple auxiliary actuators 204, such as a separate auxiliary actuator 204 for each of the extensions 202 or for subsets of the extensions 202. Moreover, in an embodiment, the actuating system 106 may include additional features to support the extensions 202. By way of example, a respective sleeve 208 (e.g., a tube, a pipe, a conduit) may enclose at least a portion of the lengths of the extensions 202 spanning between the connection locations 146, 148 and the actuators 154. Each sleeve 208 may be movably coupled to the support 160 at a corresponding joint 162 to enable the extensions 202 to rotate about the joints 162, and the extensions 202 may move through the sleeves 208 to enable the length of the extensions 202 to be adjusted. The sleeves 208 may be generally rigid to support the extensions 202 and maintain tension of the extensions 202. In other words, the sleeves 208 block slacking or loosening of the extensions 202, thereby improving control of the length of the extensions 202 and of the positioning of the connection locations 146, 148.

Figure 5:
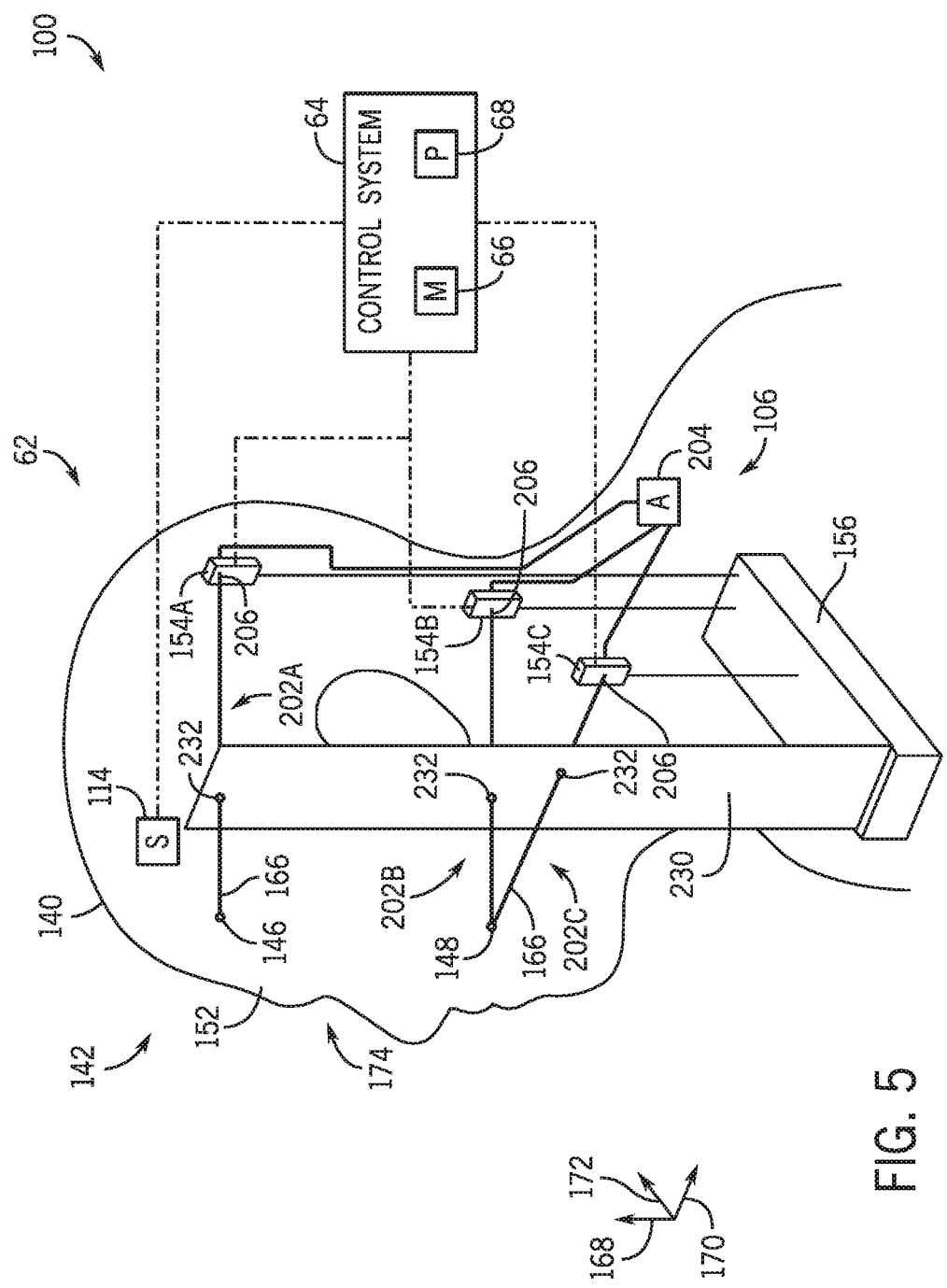
FIG. 5 is a side cross-sectional view of an embodiment of an entertainment figure system that may be used to operate an entertainment figure, in accordance with an aspect of the present disclosure.

FIG. 5 is a side cross-sectional view of an embodiment of the entertainment figure system 100 having the extensions 202 and the auxiliary actuator 204 configured to adjust the respective lengths of the extensions 202 spanning between the connection locations 146, 148 and the actuators 154. The illustrated entertainment FIG. 62 includes a panel 230, rather than the supports 160, coupled to the base 156 and configured to provide support to the extensions 202. For example, the panel 230 may include support features, such as openings 232, through which the extensions 202 extend to engage with the panel 230. The openings 232 may enable the respective extensions 202 to rotate relative to the panel 230 and/or to move through the panel 230 (e.g., to adjust the length spanning between the actuators 154 and the connection locations 146, 148). In this manner, the openings 232 may enable similar movement of the extensions 202 as that enabled by the joints 162 of the supports 160 (FIGS. 3 and 4), while providing support to the extensions 202. Although the illustrated embodiment includes a single panel 230, multiple panels 230 may be used in an additional or alternative embodiment. For example, any single one of the extensions 202 may extend through multiple panels 230, and/or each of the extensions 202 may extend through a separate panel 230. The supports 160 may be used with the panel 230.

Figure 6:
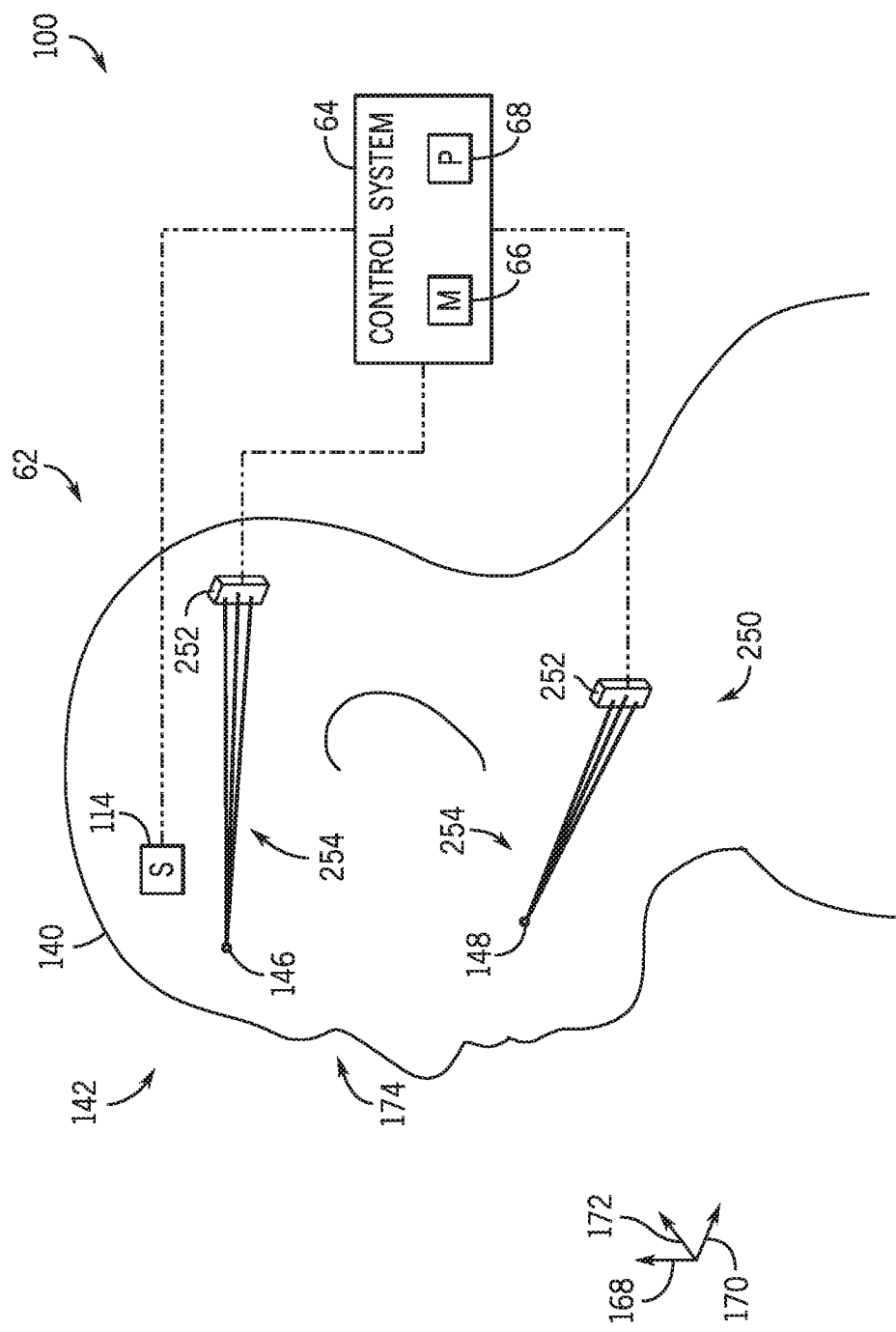
FIG. 6 is a side cross-sectional view of an embodiment of an entertainment figure system that may be used to operate an entertainment figure, in accordance with an aspect of the present disclosure.

FIG. 6 is a side cross-sectional view of an embodiment of the entertainment figure system 100 having an actuating system 250 that includes actuators 252. Each actuator 252 may include a set of extensions 254 coupled to one of the connection locations 146, 148. The actuators 252 may be configured to control the extensions 254 to move the connection locations 146, 148 in suitable manners relative to the vertical axis 168, the lateral axis 170, and/or the longitudinal axis 172. For instance, each actuator 252 may include a parallel manipulator (e.g., a delta robot, a Stewart platform) configured to move a corresponding connection location 146, 148 in six degrees of freedom. In an embodiment, the actuators 252 may be fixedly coupled to a part of the entertainment FIG. 62, such as to a base or to a mounting point, to block unintentional movement of the actuators 252 and/or of the connection locations 146, 148. Moreover, although the illustrated embodiment shows that each connection location 146, 148 is controlled by a single actuator 252, in an additional or alternative embodiment, any of the connection locations 146, 148 may be controlled by multiple actuators 252 to enable the connection location 146, 148 to be controlled more acutely. In a further embodiment, a single actuator 252 may be configured to control multiple connection locations 146, 148. For instance, a single actuator 252 may have multiple sets of extensions 254 that couple to different connection locations 146, 148. In any case, the actuators 252 may move the connection locations 146, 148 without the use of additional components or features, such as the auxiliary actuator 204 (FIGS. 4 and 5).

Figure 7:
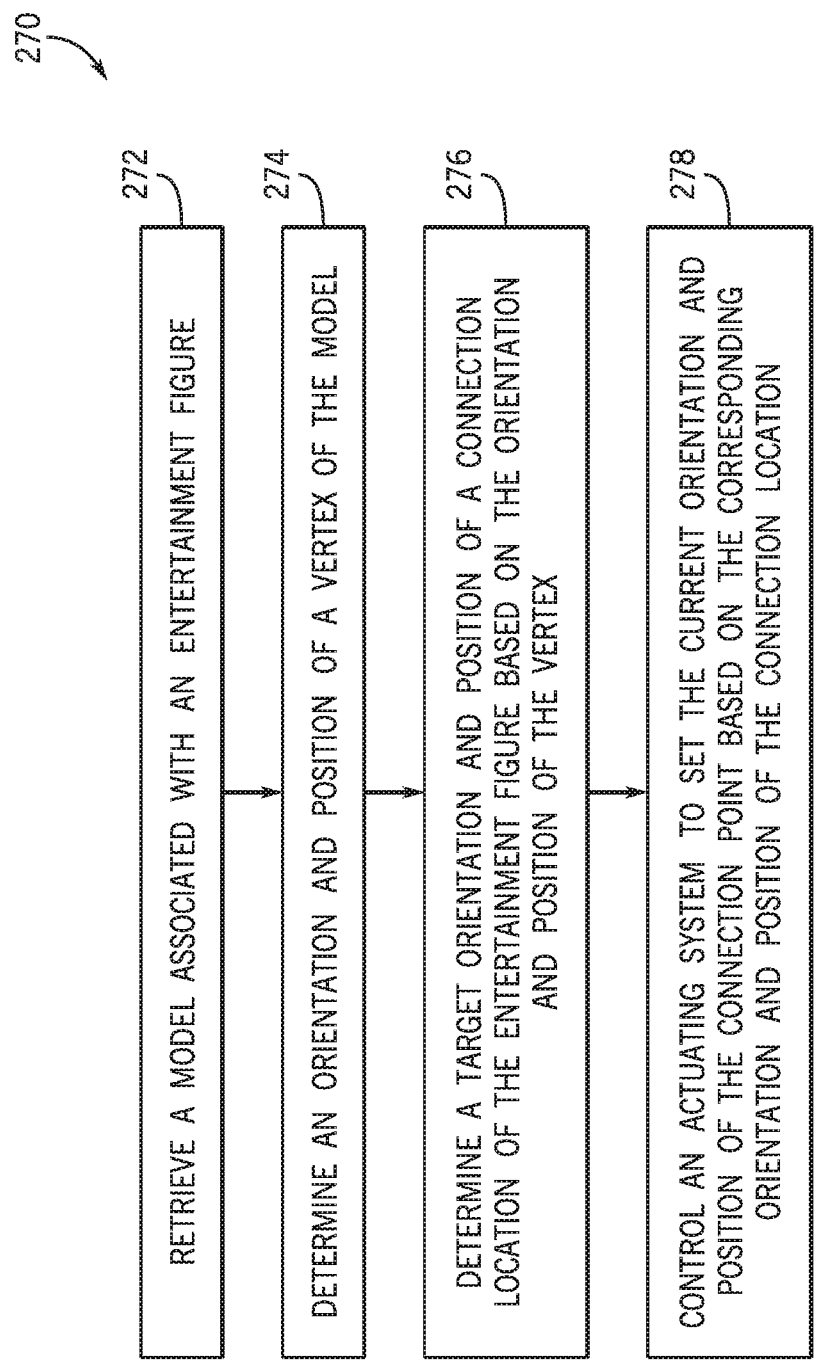
FIG. 7 is a flowchart of an embodiment of a method or process for operating an entertainment figure, in accordance with an aspect of the present disclosure.

FIG. 7 is a flowchart of an embodiment of a method 270 for operating the entertainment figure system. For example, the steps of the method 270 may be performed by a single controller, such as the control system 64 of FIGS. 1-6. It should also be noted that the steps of the method 270 may be performed differently than depicted in FIG. 7 in different embodiments. As an example, additional steps may be performed, and/or certain steps of the method 270 may be removed, modified, and/or performed in a different order.

At block 272, a model (e.g., a virtual or digital model) associated with the entertainment figure is retrieved. The model may include a single image (e.g., a pose) and/or may include several images (e.g., representing movement). Further, in an embodiment, multiple different models may be readily available (e.g., stored in a database) for retrieval. For this reason, the entertainment figure in operation may be identified such that the associated model may be selected. For instance, the particular model associated with the entertainment figure is to be retrieved. Thus, in an example, a particular model may be selected via a user input and/or via a pre-programmed selection that may be based on a parameter (e.g., a type, a requested interaction) of the entertainment figure. In another example, the entertainment figure may include an identifier, such as a serial number, a quick response code, a name, another identifying information, or any combination, and the model associated with the entertainment figure may include a corresponding identifier that a device (e.g., a mobile device) may identify. The device may then transmit the data (e.g., to the control system) that includes the identifier of the entertainment figure to enable the identifier of the entertainment figure to be matched with a suitable model to select a correctly associated model.

The model may have one or more vertices. At block 274, a positioning (e.g., position and/or orientation) of one of the vertices of the model is identified. In an embodiment, the positioning of the vertex may be relative to at least one other vertex of the model or any other suitable part of the model. In an additional or alternative embodiment, the positioning of the vertex may be an absolute positioning within a virtual space, such as in relation to a virtual coordinate system associated with the virtual space. Indeed, the positioning of the vertex may include any suitable arrangement of the vertex in the virtual space of the model. For a model having a single image, the particular positioning of the vertices for the single image may be determined. For a model having multiple images (e.g., each having different respective positionings of the vertices), a change in positioning of the vertices may be monitored or tracked.

At block 276, a connection location of the entertainment figure associated with the vertex of the model is identified, and a target positioning of the connection location is determined based on the positioning of the vertex. That is, the arrangement of the vertex in the virtual space of the model is associated with a corresponding positioning of the connection location in a physical space of the entertainment figure, and the corresponding positioning is set as the target positioning. In one embodiment, the target positioning of the connection location may be relative to at least one other connection location of the entertainment figure or any other suitable part of the entertainment figure. In an additional or alternative embodiment, the target positioning of the connection location may be an absolute positioning within the physical space, such as in relation to a physical coordinate system associated with the physical space. In any case, the target positioning of the connection location in the physical space may be suitably determined based on the positioning of the vertex in the virtual space.

At block 278, the actuating system is controlled to set the current positioning of the connection location based on the determined target positioning of the connection location. As an example, the actuating system may be controlled to move the connection location such that the current positioning (e.g., as determined by a sensor) of the connection location substantially matches with the target positioning of the connection location. In this way, the current positioning of the connection location may be associated with the positioning of the vertex. For instance, the current positioning of the connection location in the physical space substantially matches with the positioning of the vertex in the virtual space.

Furthermore, as the vertex moves, such as based on multiple images representing realistic animation of the model of the entertainment figure, subsequent target positionings of the connection location may be determined, and the actuating system may continue to be controlled to set the positioning of the connection location based on the target positionings. In this manner, movement of the connection location generally tracks the movement of the vertex, and blocks 274 through 278 may continuously be performed over time (e.g., to various positions to create a show, such as a facial expression or series of facial expressions over time). Further still, blocks 274 through 278 may be performed for each suitable vertex of the model and corresponding connection location to align multiple connection locations of the entertainment figure with corresponding vertices of the model. As such, an overall arrangement of the entertainment figure may substantially match with an overall arrangement of the model of the entertainment figure (e.g., over time). Since the model of the entertainment figure has a realistic appearance and/or movement, the control of the entertainment figure to match the model of the entertainment figure may therefore provide a more realistic presentation of the entertainment figure.

It should be noted that various features discussed with respect to FIGS. 1-7 may be combined in an embodiment. For instance, an embodiment of the entertainment figure may include any combination of the actuator types described with respect to FIGS. 4-6. In addition, other actuator types may be utilized, including pneumatic or hydraulic bladder systems, in order to enable movement of the connection locations. In any case, the control system may control any of the actuator types described above based on a retrieved digital model, such as various vertices of the digital model. Moreover, in an embodiment, rather than being coupled to and moving various connection locations, the actuators may slide underneath the layer of the entertainment figure to produce other effects, such as bone or muscular movement underneath skin. Further still, although the present disclosure primarily discusses automatically controlling the actuating system based on a stored entertainment model, the actuating system may additionally or alternative be manually controllable. In an example, the control system may receive user input that indicates direct movement of the actuating system. In another example, the user input may indicate movement of the entertainment figure model, and the control system may control the actuating system to move the entertainment figure based on the user input causing movement of the entertainment figure model. In a further example, parts of the actuating system (e.g., the extensions 158 of FIG. 3) may be physically accessible by a user (e.g., external to the entertainment figure), and the user may physically cause movement of the entertainment figure (e.g., manual puppeteering).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An animated figure system, comprising:
an animated figure comprising a flexible skin layer;
an actuating system coupled to a connection location of the flexible skin layer; and
an automation controller configured to:
access a digital model of the animated figure, wherein the digital model comprises a vertex associated with the connection location;
determine a first positioning of the vertex within the digital model; and
control the actuating system to set a second positioning of the connection location based on the first positioning of the vertex;
wherein the first positioning of the vertex comprises a first position, a first orientation, or both, of the vertex, wherein the second positioning of the connection location comprises a second position, a second orientation, or both, of the connection location, and wherein the automation controller is configured to control the actuating system to cause the second position to correspond to the first position, the second orientation to correspond to the first orientation, or both.

2. The animated figure system of claim 1, wherein the actuating system comprises an actuator and an extension, wherein the extension extends between the connection location to the actuator, and wherein the automation controller is configured to control the actuator to move the extension to set the second positioning of the connection location.

3. The animated figure system of claim 2, comprising a support coupled to the extension at a location between the connection location and the actuator via a joint that enables the extension to rotate relative to the support.

4. The animated figure system of claim 3, comprising a base, wherein the support and the actuator are coupled to the base, and wherein the support is configured to bend relative to the base as the extension moves relative to the base.

5. The animated figure system of claim 2, wherein the actuator comprises a parallel manipulator comprising a plurality of extensions that includes the extension, and wherein the automation controller is configured to control the actuator to move the plurality of extensions to set the second positioning of the connection location.

6. The animated figure system of claim 1, wherein the automation controller is configured to:
determine a movement of the vertex from the first positioning to a third positioning within the digital model; and
control the actuating system to move the connection location from the second positioning to a fourth positioning based on the movement of the vertex from the first positioning to the third positioning.

7. The animated figure system of claim 1, wherein the digital model comprises an additional vertex associated with an additional connection location of the flexible skin layer, and the automation controller is configured to determine a third positioning of the additional vertex within the digital model and to control the actuating system to set a fourth positioning of the additional connection location based on the third positioning of the additional vertex simultaneously with the second positioning of the connection location.

8. A non-transitory computer-readable medium comprising executable instructions, wherein the instructions, when executed by a processor, are configured to cause the processor to:
access a digital model of an animated figure, wherein the animated figure comprises a connection location, and wherein the digital model comprises a vertex associated with the connection location;
determine a first positioning of the vertex of the digital model;
control an actuating system of the animated figure to set a second positioning of the connection location based on the first positioning of the vertex of the digital model;
determine a plurality of positionings of the vertex over a time interval, wherein the plurality of positionings represents movement of the digital model; and
control the actuating system to move the connection location based on the plurality of positionings of the vertex.

9. The non-transitory computer-readable medium of claim 8, wherein the connection location is a first connection location, wherein the vertex is a first vertex, and wherein the instructions, when executed by the processor, are configured to cause the processor to:
determine a third positioning of a second vertex of the digital model relative to the first vertex, wherein the second vertex associated with a second connection location of the animated figure; and
control the actuating system to set a fourth positioning of the second connection location relative to the first connection location based on the third positioning of the second vertex relative to the first vertex.

10. An animated figure system, comprising:
an animated figure comprising a flexible skin layer;
an actuating system coupled to a connection location of the flexible skin layer; and
an automation controller configured to:
access a digital model of the animated figure, wherein the digital model comprises a vertex associated with the connection location;
determine a first positioning of the vertex within the digital model; and
control the actuating system to set a second positioning of the connection location based on the first positioning of the vertex;
wherein the digital model comprises an additional vertex associated with an additional connection location of the flexible skin layer, and the automation controller is configured to determine a third positioning of the additional vertex within the digital model and to control the actuating system to set a fourth positioning of the additional connection location based on the third positioning of the additional vertex simultaneously with the second positioning of the connection location.

11. The animated figure system of claim 10, wherein the actuating system comprises an actuator and an extension, wherein the extension extends between the connection location to the actuator, and wherein the automation controller is configured to control the actuator to move the extension to set the second positioning of the connection location.

12. The animated figure system of claim 11, comprising a support coupled to the extension at a location between the connection location and the actuator via a joint that enables the extension to rotate relative to the support.

13. The animated figure system of claim 12, comprising a base, wherein the support and the actuator are coupled to the base, and wherein the support is configured to bend relative to the base as the extension moves relative to the base.

14. The animated figure system of claim 11, wherein the actuator comprises a parallel manipulator comprising a plurality of extensions that includes the extension, and wherein the automation controller is configured to control the actuator to move the plurality of extensions to set the second positioning of the connection location.

15. The animated figure system of claim 10, wherein the automation controller is configured to:
- determine a movement of the vertex from the first positioning to a third positioning within the digital model; and
- control the actuating system to move the connection location from the second positioning to a fourth positioning based on the movement of the vertex from the first positioning to the third positioning.

* * * * *